(No Model.)
C. F. BRUSH.
ARMATURE FOR DYNAMO ELECTRIC MACHINES.
No. 285,457. Patented Sept. 25, 1883.
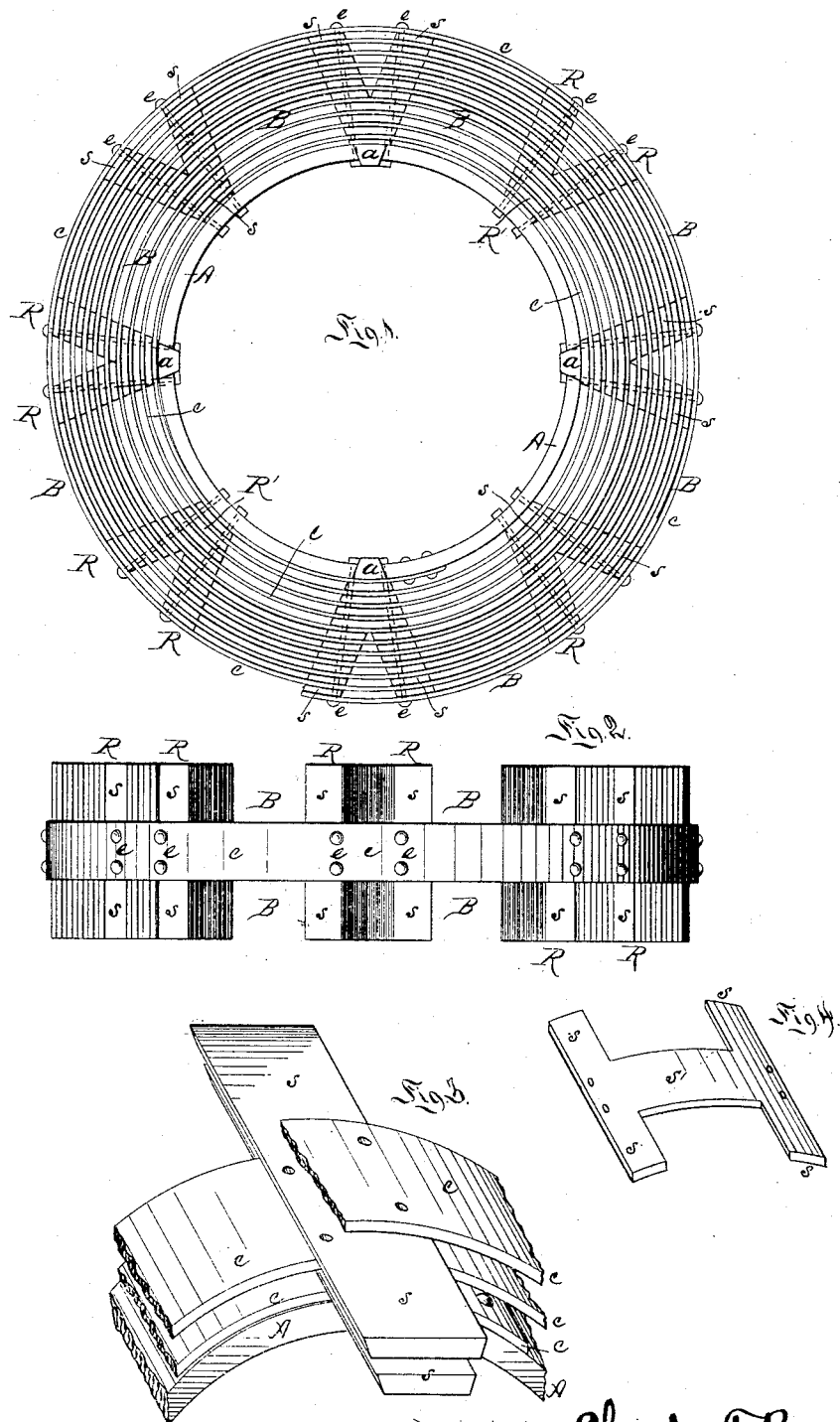
Witnesses:
W. Hughes.
George Cook.
Geo. F. Downing.
Inventor:
Charles F. Brush
By Attorneys Leggett & Leggett

UNITED STATES PATENT OFFICE.

CHARLES F. BRUSH, OF CLEVELAND, OHIO.

ARMATURE FOR DYNAMO-ELECTRIC MACHINES.

SPECIFICATION forming part of Letters Patent No. 285,457, dated September 25, 1883.

Application filed July 25, 1883. (No model.)

*To all whom it may concern:*

Be it known that I, CHARLES F. BRUSH, of Cleveland, in the county of Cuyahoga and State of Ohio, have invented certain new and useful Improvements in Armatures for Dynamo-Electric Machines; and I do hereby declare the following to be a full, clear, and exact description of the invention, such as will enable others skilled in the art to which it pertains to make and use the same.

Figure 1 is a side view, or a view in elevation, of my improved armature, but without the bobbins. Fig. 2 is a top or edge view thereof. Fig. 3 is an enlarged view, in perspective, of a detached portion of the armature; and Fig. 4 shows a modified form of plate which may be employed.

My present invention relates to certain improvements in the construction of the revolving armatures of electric-current-generating machines, and more particularly to armatures of the kind or class such as is shown and described in Letters Patent No. 189,997, granted to me August 24, 1877, and reissued October 12, 1880, by reissue No. 9,410, and also in Letters Patent No. 204,413, granted to me May 7, 1878. The armature of the present invention is an improvement on the armatures of said patents, chiefly in the fact that the laterally-projecting portions thereof, between which the wires are wound to form the bobbins, are formed or built up of a series of comparatively thin and distinct metallic plates interposed between the coils or folds of a metallic ribbon, which, when coiled, forms, either alone or in connection with an inner or base ring on which it is wound, the annular portion of the armature. Preferably, and chiefly for convenience in mechanical construction, I employ the base-ring, and coil or wind the band thereon very much as ribbon is spooled; but in the operation of winding I interpose between the coils, on either side of the point or place where bobbins are desired, thin soft-metal plates, the ends of which project out laterally beyond the sides of the band-formed ring a distance equal or about equal to the thickness of the bobbin or bundle of wires to be wound around the band-formed ring, so that both the bobbins and the plates, when the armature is revolved in the machine, shall just clear the pole-pieces of the field-magnets.

In the drawings, A indicates the base or inner ring, made thick enough to give a suitable support to the flexible band wound thereon; and I also employ it as a device by which— say through lugs *a a* or otherwise—to make connection between the armature and the hub of the driving-shaft. Its breadth should be exactly or approximately that desired in the body of the armature-ring, of which the band *c* forms a part. This band *c*, of any desired length, and of iron or other suitable magnetizable material, is secured at one end to the ring A, and then wound on and around its periphery any desired number of times, with reference to the making of an armature of any desired size; but at each side of those places or points at which wires are to be wound around the armature-ring to form bobbins, I introduce between the successive folds or plications of the band a thin metallic strip or plate, *s*, which lies crosswise of the band, and with its ends projecting a distance equal or about equal to the thickness of the coil of wire which is to form the bobbins. Each series or pile R of transverse plates *s* is built up on a line parallel to the radial line passing through the middle of the adjacent space B, as shown, but with one or more folds or plications of the band between each two in succession, and, where the bobbins are to be arranged, as close together as possible. The piles R which come between two adjacent bobbins will branch in a V form from a single base-pile, R', and such base part may be made of strips which gradually increase in width, or of edgewise overlapping strips, or of two series of narrow but gradually widening strips, as may be preferred. The armature shown in the drawings is spaced or divided up by the piles or series R so as to give eight intermediate spaces, B, as bobbin spaces or recesses in which to wind the bobbin-wires; but the spacing may be varied at pleasure, so as to give fewer or smaller bobbin spaces or recesses. Plates and bands may be painted or otherwise coated or covered with insulating material, if so desired, though for most purposes the oxide ordinarily present will suffice for purposes of insulation. When the armature has thus been built up to the desired size or extent, the outer end of the band is secured to the outer fold by riveting or otherwise, and rivets or bolts $e$ are passed radially through each pile or series of plates, and through the interlying band-folds, so as to secure all firmly in place. The bobbins are then wound and connections made in the manner described in said recited patents, or otherwise, as may be preferred. As plates and bands are thus entirely disconnected with each other, except over the comparatively small area where the former cross the latter, and as practically they are insulated from each other over these areas, and as open air-spaces exist between them at all other points, I thus secure greater exemption from the evils of heating, induction, &c., and lessen the first cost, and also secure in the completed machine a considerable and material increase of electric generating capacity.

It will be but a slight modification, instead of making the band $e$ continuous, as above described, to divide it up into a series of bands or rings, each outer one exceeding the diameter of the next inner one by twice the thickness of one of the plates, and in the following claims I will use the term "band-formed armature-ring" as including the construction described, whether the band that forms the ring be coiled continuously or be subdivided into separate ring-shaped bands, as above described. Of course the edges of the bands may be notched at or along the spaces B; or each two adjacent plates $s$, which are interposed between two band-rings or band-folds, may be connected by cross-bar $s'$, Fig. 4, so as to form a compound or H-shaped plate; or other modification in the form of the plates or bands may be made; and while I prefer the use of the inner or base ring, A, on which to coil or wind, one or more central or inside coils of the band may be used as a base by which or from which to make the necessary connections with the hub, and on which to coil and build, as above described.

I claim herein as my invention—

1. The plates $s$, in combination with a band-formed armature-ring, substantially as described.

2. A band-formed armature-ring having separate plates interposed at suitable intervals between the folds, layers, or plications of the ring, substantially as set forth.

In testimony whereof I sign this specification, in the presence of two witnesses, this 17th day of July, 1883.

CHARLES F. BRUSH.

Witnesses:
  ALBERT E. LYNCH,
  GEO. W. KING.